United States Patent [19]

Wilson

[11] 3,954,229

[45] May 4, 1976

[54] AUTOMATIC ONE-PER-REV CONTROL SYSTEM

[75] Inventor: William F. Wilson, Bedford, Tex.

[73] Assignee: Textron, Inc., Providence, R.I.

[22] Filed: Jan. 2, 1975

[21] Appl. No.: 538,121

[52] U.S. Cl............................... 244/17.13; 73/455; 73/462; 244/17.27; 416/500
[51] Int. Cl.²........................................ B64C 27/70
[58] Field of Search ........... 73/455, 462; 244/17.13, 244/17.27, 77 R; 416/23, 24, 31, 500

[56] References Cited

UNITED STATES PATENTS

| | | | |
|---|---|---|---|
| 2,891,741 | 6/1959 | Ellis et al. .......................... | 244/17.13 |
| 3,617,020 | 11/1971 | Gerstine et al. .................. | 244/17.27 |
| 3,635,427 | 1/1972 | Balke .............................. | 244/17.27 |
| 3,795,375 | 3/1974 | Lemnios ......................... | 244/17.27 |

Primary Examiner—Trygve M. Blix
Assistant Examiner—Stephen G. Kunin
Attorney, Agent, or Firm—Richards, Harris & Medlock

[57] ABSTRACT

Vibration in the helicopter fuselage produced through the helicopter rotor at a frequency of one for each rotation of the rotor (commonly identified in the art as a one-per-rev vibration) is controlled by applying a correction signal to the primary cyclic control system of the rotor assembly. To generate the correction signal, a transducer responds to the one-per-rev vibrations to generate a signal coupled to circuitry for generating a vibration related signal dependent upon the amplitude and phase of the one-per-rev vibrations. The vibration related signal is applied to a sample and store network wherein it is demodulated by a reference signal related to the rotational speed of the helicopter to establish a control voltage which varies at a rate in dependence upon variation in the maximum amplitude of the one-per-rev vibrations. This control voltage is integrated and modulated by the reference signal thereby resulting in the correction signal for application to the primary cyclic control system. The reference signal for both the demodulation and modulation steps is generated by combining a reference pulse having a phase corresponding to a desired cyclic pitch generated for each revolution of the helicopter with a pulse train synchronized with the reference pulse at a repetition rate related to rotation of the helicopter rotor. In one embodiment of the invention a manually adjustable ride control voltage is generated that has a magnitude related to a desired vibration correction. This ride control voltage is switched alternately with the control voltage to be modulated by the reference signal.

25 Claims, 9 Drawing Figures

AUTOMATIC ONE-PER-REV CONTROL SYSTEM

This invention relates to an automatic cyclic control system for controlling the one-per-rev vibrations in the fuselage of a helicopter, and more particularly involves the generation and utilization of a control signal at relative frequency of one per rotor revolution in the primary cyclic control system.

Heretofore, efforts have been made to reduce the one-per-rev vibrations in a helicopter airframe. One-per-rev vibrations in the airframe of a helicopter have been identified as resulting from rotor blade mass unbalance. When rotor blade mass unbalance is present it can be observed with the blades at rest by the tilting of the rotor assembly in the direction of the heavier blade. Such mass unbalance also produces spin unbalance when the rotor is operational. Similarly, mass unbalance can be present due to chordwise mass differences between the two blades of a rotor.

A second source of one-per-rev vibrations is aerodynamic unbalance due to differences in lift and/or drag between the two blades. Fabrication of the airfoils comprising helicopter blades, though carefully controlled, has been found to result in structural differences which reflect themselves in substantial vibration when in use. The twist of the blade, its contour, and failure to maintain dimension control to within a few thousandths of an inch in massive blade structures can readily be appreciated as comprising a source of aerodynamic unbalance. Blades having chord dimensions of 30–48 inches and lengths of up to 25 feet currently as being fabricated. Small aerodynamic differences are often the cause of intense one-per-rev vibrations.

Early efforts to reduce the one-per-rev vibrations utilized the manual setting of movable trim tabs provided with each rotoar blade. These trim tabs are set with the rotor stationary and the rotor is then subjected to a series of whirl tests during which the tracking characteristics of each blade are recorded. A skilled mechanic then makes minute changes in the trim tabs until the rotor is satisfactorily balanced. Complex systems have been developed to monitor the blade tracking for the mass balance of rotor blades. However, the tabs on each blade must still be manually adjusted to trim each rotor blade until its tracks evenly.

In addition to the manual adjustment of trim tabs, at least two in-flight systems for trimming helicopter rotor blades have been developed. One of these systems utilizes a control link associated with each blade as part of the primary flight control system. The control link is in the form of an actuator which is selectively operated in flight to vary the instantaneous configuration of the servoflap of one blade relative to that of another blade. Another attempt to provide in-flight correction included a rotor blade trimming system completely independent of the primary flight control system. Such a system, like the variable link system, requires complicated and unreliable mechanisms in the rotating system.

A feature of the present invention is to provide for the control of one-per-rev vibrations in a helicopter by the in-flight adjustment of the standard cyclic pitch control system. Another feature of the present invention is to provide for control of one-per-rev vibrations in a helicopter with a system adapted for coupling to the standard cyclic pitch control of a helicopter. Still another feature of the present invention is to provide for control of one-per-rev vibrations in a helicopter without modification of the standard cyclic pitch control system.

In accordance with the present invention, one-per-rev vibrations in a helicopter fuselage are controlled by generating a mechanical motion having a frequency and phase corresponding to a desired cyclic pitch. In addition, a vibration related electrical signal is generated dependent upon the amplitude and phase of one-per-rev vibrations in the helicopter fuselage. This vibration related signal is sampled and stored to establish a control voltage which varies at a rate in dependence upon variation in the maximum amplitude of the one-per-rev vibrations. The mechanical motion is then applied to a standard cyclic control system at an amplitude dependent upon the control voltage.

Also in accordance with the present invention, a system for controlling one-per-rev vibration in a helicopter airframe comprises means for generating a reference signal having a frequency related to the speed of rotation of the helicopter rotor and at a phase corresponding to a desired cyclic pitch. In addition, the system includes means for generating a control voltage having a magnitude related to the one-per-rev vibrations in the fuselage of a helicopter. The control voltage is then applied to a modulator wherein it is modulator by the reference signal and applied to the helicopter rotor cyclic pitch control system.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

There may exist two basically different types of helicopter rotor unbalance. One source of unbalance (inertial unbalance) is due to the physical weight distribution of the rotor blades such that the center of gravity is not at the center of rotation. The second unbalance (aerodynamic unbalance) is due to differences between the aerodynamic forces, i.e., lift, drag and pitching moment, acting on the two blades as each blade rotates to the same azimuth position.

Figure 1:
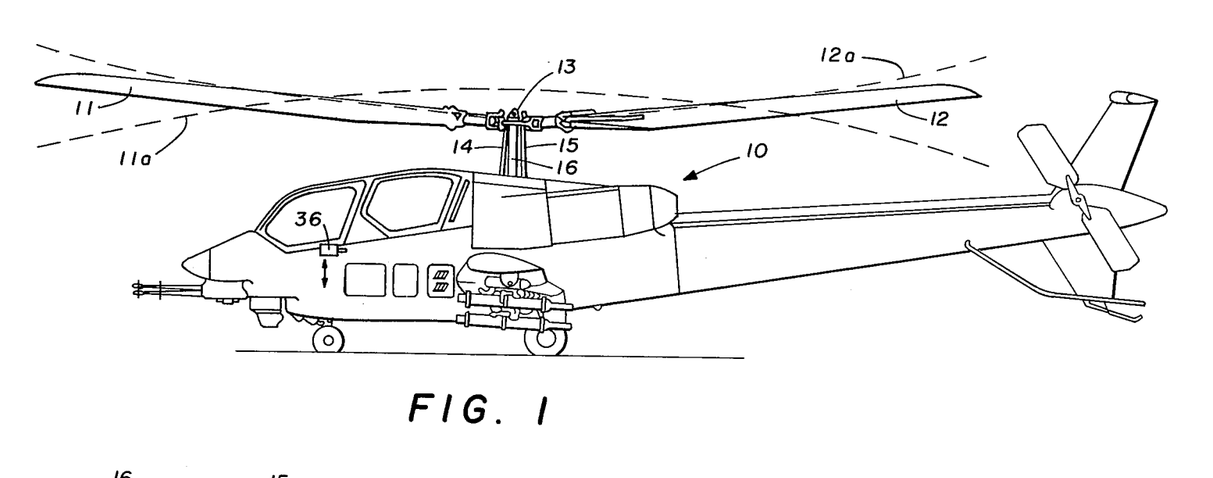
FIG. 1 illustrates a helicopter to show the effect of rotor aerodynamic unbalance.

In FIG. 1, helicopter 10 has a main rotor with two blades 11 and 12 attached to hub 13 by conventional grips and which are controlled as to pitch through respective pitch angle control linkages 14 and 15. The rotor assembly is turned by a vertical rotor mast 16.

Figure 2:
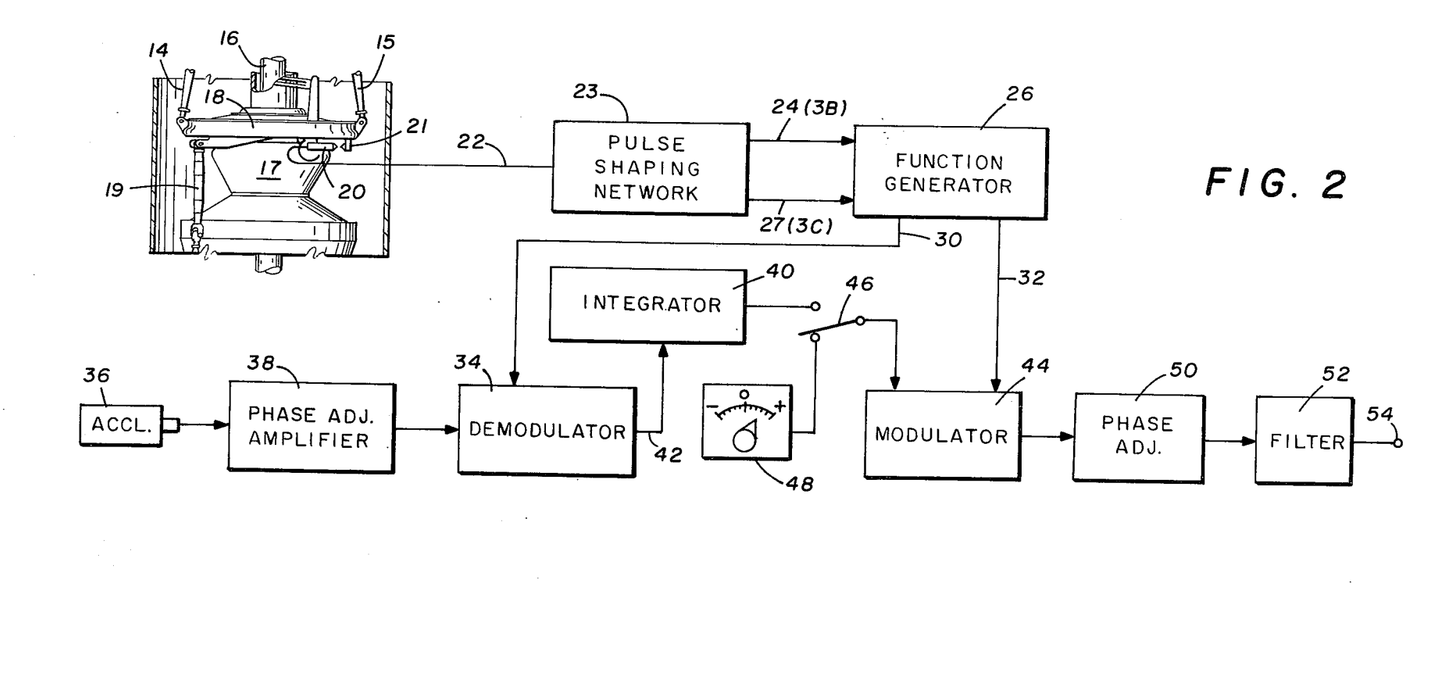
FIG. 2 is a block diagram of a preferred embodiment of the system for eliminating one-per-rev vibration in a helicopter airframe due to mass or aerodynamic rotor unbalance.

The rotor blades 11 and 12 generate lift depending upon blade pitch angles as controlled through linkages 14 and 15. In forward flight blades significantly out of track may trace tip paths, such as 11a and 12a. Failure to track will be due to aerodynamic unbalance. The present invention provides for automatic control to minimize the aerodynamic unbalance. As shown in FIG. 2, the rotor mast 16 is rotatably mounted in a transmission housing 17. The transmission housing 17, though generally anchored to the airframe against rotation, is cushion mounted in a manner that generally accommodates some rotor mast transverse motion relative to the airframe.

A swashplate 18 has a fixed portion which is double gimbal mounted so as to be tilted in response to control inputs such as by way of a linkage 19 in the cyclic system, thereby controlling the swashplate output linkages 14 and 15. A magnetic sensor 20 is mounted on the fixed portion of the swashplate 18. Cooperating with the magnetic sensor 20 is a series of magnetic elements 21 (only one shown) mounted on the rotating rim of the swashplate 18. As the rotor mast 16 rotates it carries the elements 21 past the sensor 20 and there is produced on channel 22 a series of pulses related to each revolution of the rotor blades mounted to the rotor mast 16. One of the elements 21 includes a double arrangement mounted such that the output pulses on channel 22 have two immediately occurring pulses appearing at the instant that a designated one of the rotor blades is in alignment with the fore/aft axis of the helicopter airframe as it passes over the tail boom.

In accordance with one correction, one of the blades of a two blade rotor is designated as the red blade, i.e., it has a red mark thereon at or near its tip. As the red blade passes over the tail boom, a double pulse appears on channel 22. This double pulse along with a series of single pulses is then applied to a pulse shaping network 23. One output of the network 23, appearing on channel 24, is applied to one input of a function generator 26 and the second output, appearing on channel 27, is also applied to the generator 26.

Figure 3:
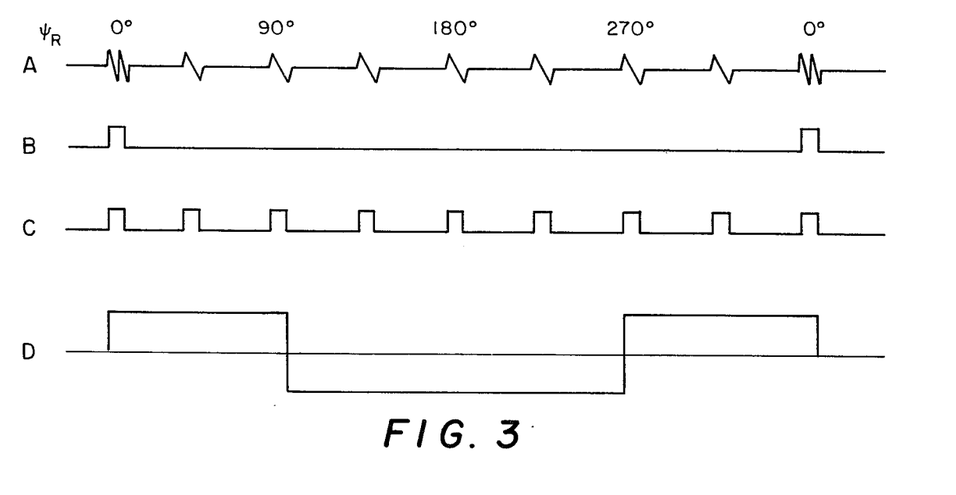
FIG. 3 is a series A-D of waveforms illustrating the operation of the system of FIG. 2.

Referring to FIG. 3, there is shown a series of spike pulses in graph A generated at the magnetic sensor 21 on the channel 22. The double pulse spikes 29 occur once for each revolution of the main rotor, as for example, when the red blade passes over the helicopter tail boom. Each of the other spike pulses of graph A of FIG. 3 are equally spaced and are generated by single magnetic elements 21 spaced about the rim of the swashplate 18. As illustrated, there is one double spike pulse 29 and seven single spike pulses for each revolution of the main rotor.

This series of single and double spike pulses on the channel 22 is fed to the pulse shaping network 23 to produce the waveforms of graphs B and C FIGS. 3 on the channels 24 and 27, respectively. The individual pulses of the waveform of graph B of FIG. 3 occur once for each revolution of the main rotor and are triggered by the double spike pulses 29. This series of pulses contains phase related information for generating the correction signal to a cyclic control system for positioning the link 19. The series of pulses of the waveform of graph C of FIG. 3, as generated on the channel 27, provides information for synchronizing the generation of correction signals to the stabilization control and augmentation system (SCAS) with rotation of the main rotor.

Referring again to FIG. 2, two square wave output functions are generated on the channels 30 and 32. These two square wave functions are in phase having a transition from the most positive amplitude to the most negative amplitude occurring at 90 degrees from a zero reference axis. The square wave function on the channel 30 is applied to a demodulator 34 as part of a feedback circuit for generating vibration related data. A second input to the demodulator 34 is derived from an accelerometer 36 whose output is applied by way of a phase adjustment amplifier 38 to the second input of the demodulator. From the demodulator 34 a demodulated signal is connected to an integrator 40 by way of channel 42. The integrator 40 generates a control voltage varying in magnitude with the vibrations sensed by the accelerometer 36.

Preferably, the accelerometer 36 is mounted on the console between the pilot and copilot within the fuselage of the helicopter 10 and is oriented such that it senses vertical components of acceleration at the console. The console location is preferred because it is at the focus of the region most generally desired to be free from vibration. In one embodiment of the invention, the accelerometer 36 was of the type manufactured and sold by Systron Donner of Concord, California and identified as a Linear Servo Accelerometer, Model 4384A-4-P-27.

The second square wave one-per-rev output of the function generator 26 on the channel 32 is connected to one input of a modulator 44. A second input to the modulator 44 is through a two position switch 46 having one input from the integrator 40 and a second input from a manual controller 48. This one-per-rev square wave on the channel 32 has a desired phase relative to the double spike pulse 29 from the sensor 20.

The manual controller 48 is provided together with the selector switch 46 so that when the switch 46 is in the position illustrated, the pilot by means of a potentiometer as a part of the controller 48 produces a control voltage of a polarity and magnitude to provide a selected ride control. This substitutes the pilot and his physical vibration sensing mechanism for the accelerometer 36 to permit him to adjust the potentiometer of the controller 48 until the one-per-rev vibration in the helicopter fuselage satisfies his requirements.

Functionally, the modulator 44 receives the one-per-rev square wave on the channel 32 and a control voltage from either the integrator 40 or the manual controller 48 to produce an output having a desired phase relationship and varying in magnitude with the control voltage. This output of the modulator 44 is the correction signal applied to the stabilization control and augmentation for adjusting the linkage 19. An output of the modulator 44 is applied to a phase adjustment amplifier 50 and from the amplifier 50 is connected to a filter 52 with the phase adjusted and filtered correction signal appearing in an output terminal 54.

In operation of the circuit of FIG. 2, rotation of the main rotor of the helicopter 10 generates the series of spike pulsees of the waveform of graph A of FIG. 3 at the sensor 20 on the channel 22. This spike pulse waveform is applied to the phase shaping network 23 that generates the pulse trains of the waveforms of graphs B and C of FIG. 3. The waveform of graph B of FIG. 3 provides phase related information to a function generator 26 and the waveform of graph C of FIG. 3 provides synchronous information, also to the generator 26. The function generator 26 provides one-per-rev square wave signals on the channels 30 and 32 as shown in FIG. 3D. These one-per-rev square wave signals have a phase relationship related to the rotation of the main rotor that provides a one-per-rev sine wave signal to the stabilization control and augmentation system for positioning theh linkage 19.

A vibration related signal is generated at the output of the accelerometer 36 and applied to a phase adjustment amplifier 38. The vibration related signal varies in accordance with the one-per-rev vibrations of the helicopter fuselage as sensed by the accelerometer 36. In the phase adjustment amplifier 38, the vibration related signal is phase adjusted to fine tune the relationship between the vibration related signal and the one-per-rev square wave on the channel 30. These two signals are applied to the demodulator 34 wherein the one-per-rev square wave demodulates the accelerometer signal.

Typically, any input to the demodulator 34 from the accelerometer 36 is a 5 Hz sine wave and it is developed as a result of the helicopter 10 shaking at one-per-rev vibrations. This 5 Hz signal is selectively sampled in the demodulator 34 in response to the one-per-rev square wave on the channel 30 to produce a control voltage on the channel 42 having an amplitude related to the vibrations of the helicopter 10. This control voltage is integrated with respect to time in the integrator 40 to produce at the select switch 46 a time related voltage applied to the modulator 44. Alternatively, the modulator 44 receives a manual control voltage from the controller 48.

In the modulator 44, the one-per-rev square wave on the channel 32 modulates the control voltage to produce a sine wave output to the phase adjusting amplifier 50. Because the interrelationship between the controls of the rotor and the fuselage acceleration cannot be clearly defined, the sine wave output of the modulator 44 is phase adjusted in the amplifier 50 to apply the optimum phase desired to the correction signal coupled to the SCAS. This phase adjusted correction signal is passed through the filter 52 to minimize unwanted noise from the signal appearing at the terminal 54.

Figure 4:
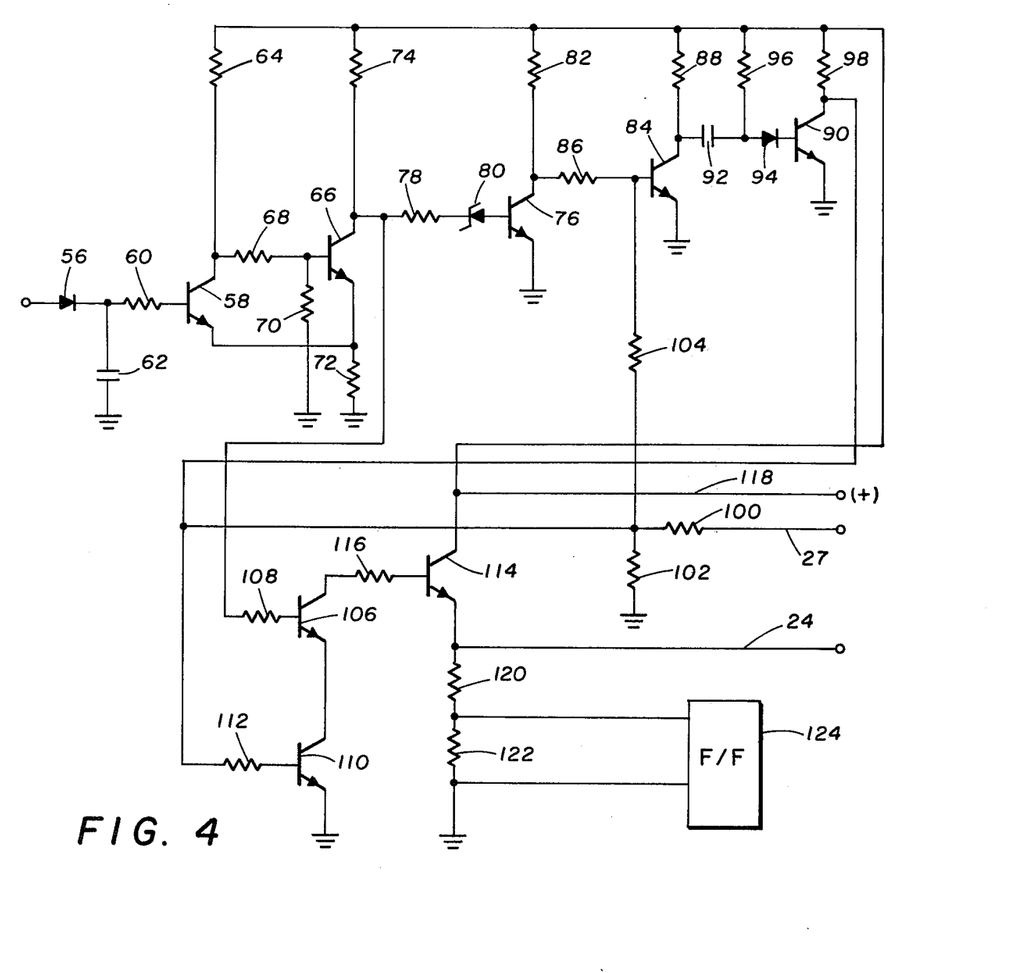
FIG. 4 is a schematic of a pulse shaper network responsive to rotor rotation and producing a one-per-rev pulse train and a pulse train repeating at a rate related to rotation of a helicopter rotor assembly.

Referring to FIG. 4, there is shown a schematic of the pulse shaping network 23 where a signal from the sensor 20 is applied to the anode electrode of a diode 56 as part of an input circuit to a transistor 58 including a resistor 60 and a capacitor 62. An output voltage from the transistor 58 is generated at the collector electrode by means of a collector resistor 64 and is applied to the base electrode of a transistor 66 through a voltage divider of resistors 68 and 70. Both the transistors 58 and 66 have emitter electrodes interconnected through a resistor 72 to ground.

The transistors 58 and 66 provide amplification to the output of the sensor 20 to develop a signal at the collector electrode of the transistor 66 through a collector resistor 74 for applying to two pulse shaping transistors 76 and 106. The collector output of the transistor 66 is applied to the base electrode of a pluse shaping transistor 76 through a resistor 78 in series with a Zener diode 80. This transistor provides amplification and generates at a collector electrode an output through a resistor 82 that is applied to the base electrode of a transistor 84 through a base drive resistor 86. The transistor 84 provides an output at the collector electrode through a resistor 88 for coupling to the base electrode of a transistor 90 through a coupling capacitor 92 in series with a diode 94. Tied to the interconnection of the capacitor 92 and the diode 94 is a resistor 96.

An output from the transistor 90 is the pulse train shown by the waveform of graph C of FIG. 3 and is generated at the collector electrode through a resistor 98. This pulse train voltage is generated on the channel 27 through a divider network including resistors 100 and 102. Also connected to the collector electrode of the transistor 90 is a feedback resistor 104 coupled to the base electrode of the transistor 84.

Returning to the collector electrode of the transistor 66, the voltage generated is also applied to the base electrode of the pulse shaping transistor 106 through a base drive resistor 108. Connected to the emitter electrode of the transistor 106 is a synchronizing transistor 110 driven by the output from the transistor 90 through a resistor 112. Operation of the transistor 110 insures that the phase related pulses of the waveform of graph B of FIG. 3 are synchronized with the pulse train of graph C of FIG. 3.

An output voltage from the transistor 106 is applied to the base electrode of a transistor 114 through a base drive resistor 116. The transistor 114 is emitter coupled to the positive terminal of a DC supply connected to a line 118. This line also supplies driving voltages to the transistors 58, 66, 76, 84, and 90.

The output of the transistor 114 at the collector electrode is the phase related pulse of the waveform of graph B of FIG. 3 appearing on the channel 24 and having a magnitude controlled by resistors 120 and 122. A voltage developed across the resistor 122 drives a flip-flop 124.

Figure 5:
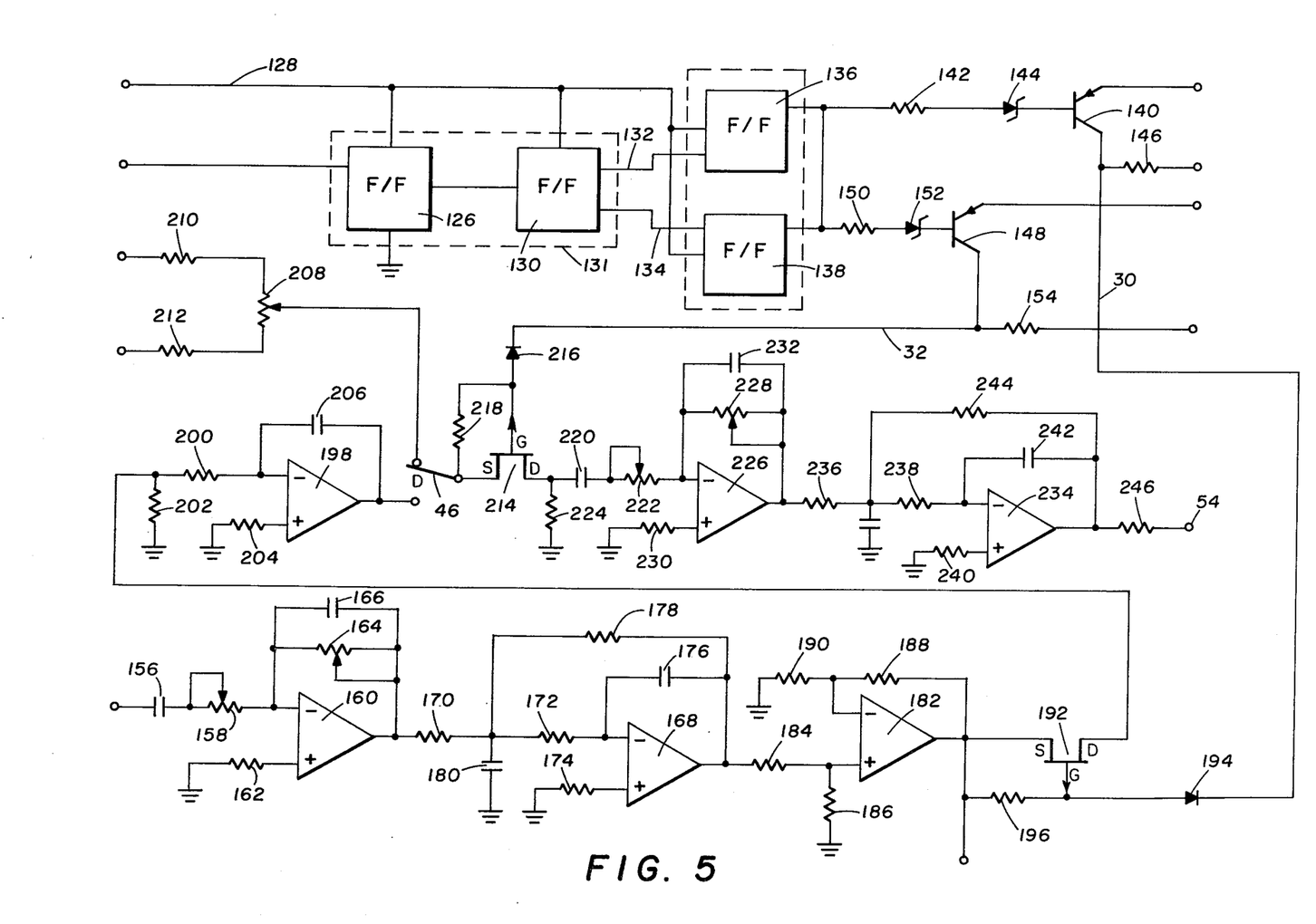
FIG. 5 is a schematic of a system of FIG. 2 responsive to the pulse trains of FIG. 4 in addition to an accelerometer output to generate a correction signal to a cyclic control system.

Referring to FIG. 5, there is shown a schematic of the system of FIG. 2 receiving the pulse waveforms from the pulse shaping network 23. Outputs from the circuit of FIG. 4 at the resistor 100 and the collector electrode of the transistor 114 are applied to a first flip-flop 126 with the output of the transistor 114 applied to the enable terminal over a line 128. The output of the flip-flop 126 is applied to a flip-flop 130 that also receives an enable pulse from the transistor 114 on the line 128.

As arranged, the flip-flops 126 and 130 comprise a pulse divider network 131 to produce two square wave functions on channels 132 and 134. The square wave function on the channel 132 is applied to a flip-flop 136 along with the output of the transistor 114. Similarly, the output of the flip-flop 130 on the channel 134 is applied to a flip-flop 138 also with the output of the transistor 114. Each of the flip-flops 136 and 138 generates an output that is combined into a one-per-rev square wave function as illustrated by the waveform of graph D of FIG. 3. This square wave voltage is applied to two amplifiers for generating the one-per-rev square wave functions on the channels 30 and 32.

The amplifier providing the square wave on the channel 30 comprises a transistor 140 having a base electrode driven from the flip-flops 136 and 138 through a resistor 142 in series with a Zener diode 144. The square wave voltage from the transistor 140 is generated at the collector electrode through a resistor 146.

The amplifier providing the one-per-rev square wave on the channel 32 includes a transistor 148 having a base electrode coupled to the output of the flip-flops 136 and 138 through a resistor 150 in series with a Zener diode 152. An output from the transistor 148 is generated at the collector electrode through a resistor 154.

Signals generated at the output of the accelerometer 36 are applied to the circuit of FIG. 5 at a high pass filter comprising a capacitor 156 in series with a variable resistor 158. This high pass filter eliminates any DC component in the output of the accelerometer 36. Signals transmitted through the high pass filter are applied to one input of a differential amplifier 160 as part of the phase adjustment amplifier 38. A second input of the differential amplifier 160 is grounded through a resistor 162.

To provide a phase adjustment at the output of the amplifier 160, a variable resistor 164 is connected in parallel with a capacitor 166 as part of a feedback circuit. This circuit connects to the output of the amplifier 160 and the input at the variable resistor 158.

The filtered and phase adjusted output of the accelerometer 36 is applied to an active filter including a differential amplifier 168. Connected to the inverting input of the amplifier 168 through resistors 170 and 172 is the output of the amplifier 160. The noninverting input of the amplifier 168 is grounded through a resistor 174. Two feedback loops are connected around the amplifier 168. The inner loop includes a filter capacitor 176 connected from the amplifier output directly to the interting input terminal. The second feedback loop consists of a resistor 178 connected to the junction of the resistors 170 and 172 and to a capacitor 180.

After passing through the amplifiers 160 and 168, the accelerometer output is a 5 Hz sine wave voltage related to the one-per-rev vibrations in the fuselage of the helicopter 10. This 5 Hz sine wave voltage is amplified in a differential amplifier 182 connected to the amplifier 168 through a divider network including resistors 184 and 186. The output of the amplifier 182 is connected to a feedback resistor 188 that is also tied to the inverting input of the amplifier. The inverting input of the amplifier 182 is also connected to ground through a resistor 190.

At the output of the amplifier 182 there is generated a 5 Hz sine wave voltage that is applied to the source terminal of a field effect transistor 192. This transistor comprises the demodulator 34 with the one-per-rev square wave on the channel 30 connected to the gate electrode of the transistor 192 through a diode 194. The bias circuit for the transistor 192 includes a resistor 196 connected to the output of the amplifier 182.

At the drain electrode of the transistor 192 there is generated a control voltage varying in amplitude in accordance with the one-per-rev vibrations in the helicopter. This control voltage is coupled to the input of the integrator 40 that comprises a differential amplifier 198.

The output voltage of the transistor 192 is connected to the amplifier 198 through a divider network including resistors 200 and 202. Connected to the noninverting input terminal of the amplifier 198 is a resistor 204. An integrating capacitor 206 is connected to the output of the amplifier 198 and to the input at the resistor 200. Thus, the output of the amplifier 198 is a control voltage varying in accordance with a time constant established by the integrating capacitor 206. This output from the amplifier 198 is connected to the select switch 46.

Also connected to the select switch 46 is the manual controller 48 comprising a potentiometer 208 in series with resistors 210 and 212. As explained, by adjusting the potentiometer 208 a pilot selects his own ride control by generating a ride control voltage connected to the select switch 46.

Either the voltage from the potentiometer 208 or the output of the amplifier 198 is connected to one input of the demodulator 44 at the source electrode of the field effect transistor 214. The second input of the modulator 44 is the one-per-rev square wave on the channel 32 connected to the transistor 214 through a diode 216. The base drive voltage for the transistor 214 is provided by resistor 218.

A voltage at the drain electrode of the transistor 214 is in phase with the one-per-rev square wave on the channel 32 and has a magnitude varying in accordance with the amplitude of the output of the accelerometer 36.

The output voltage at the drain electrode of the transistor 214 is connected to a resistor 224 and is also coupled to a filter comprising a capacitor 220 in series with a variable resistor 222. From the filter circuit, the one-per-rev related voltage from the transistor 214 is applied to a differential amplifier 206 having a phase adjustment variable resistor 228 in a feedback loop. A second input to the amplifier 226 is grounded through a resistor 230. In parallel with the variable resistor 228 in the feedback loop is a filter capacitor 232 that provides further filtering to the output of the transistor 214.

From the amplifier 226, the one-per-rev voltage is coupled to an active filter 52 including a differential amplifier 234 that shapes the square wave output of the transistor 214 into a 5 Hz sine wave correction signal applied to the stability and control augmentation system. Included as a part of the filter 52 are resistors 236 and 238 in the input circuit to the inverting input terminal of the amplifier 234. The noninverting input terminal is connected to ground through a resistor 140. Two feedback loops are provided for the amplifier 234 including an inner feedback loop of a capacitor 242 and an outer feedback loop including a resistor 244. The output of the amplifier 234 is applied through a resistor 246 to the terminal 54 as the correction signal to the stability and control augmentation system as explained previously.

Figure 6:
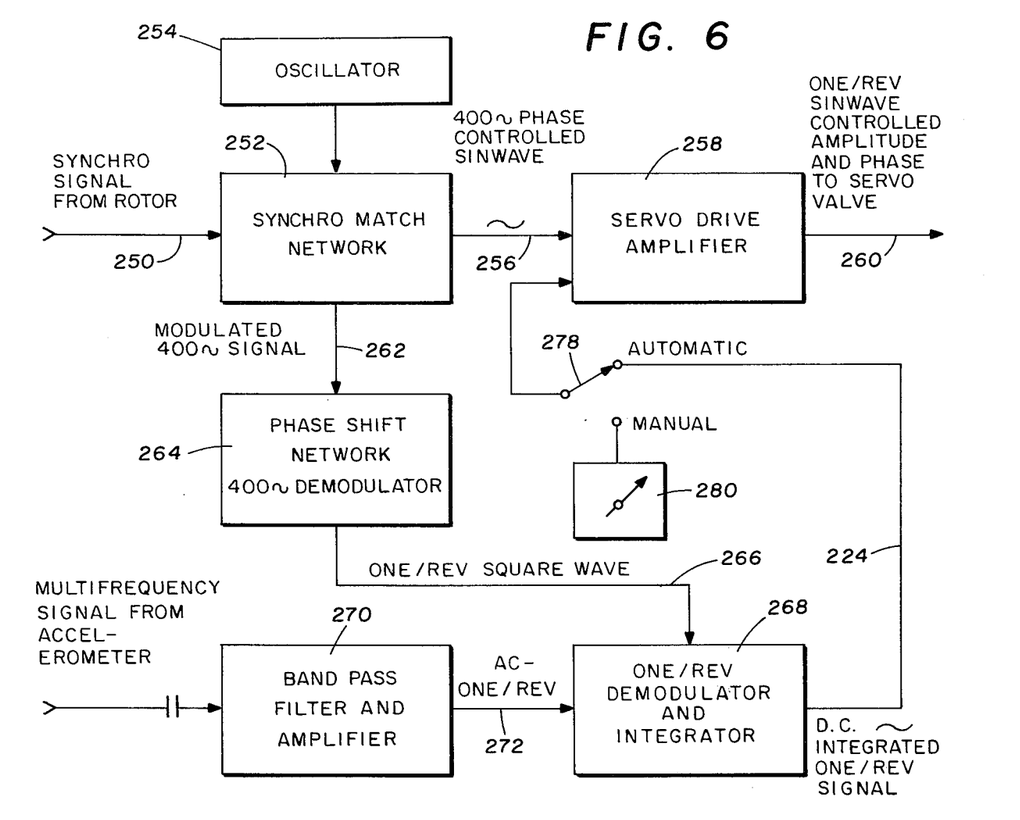
FIG. 6 is a block diagram of an alternate embodiment of a system for producing a correction signal to the servovalve of a stabilization control and augmentation system.
Figure 7:
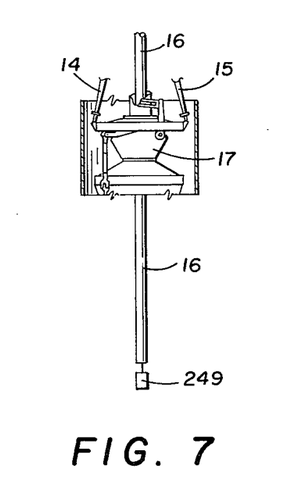
FIG. 7 is an enlarged view of the vertical rotor mast for a helicopter rotor assembly with rotating magnets of synchro circuits coupled to the lower end for use with the alternate embodiment of FIG. 8.

Referring to FIGS. 6 7, there is shown an alternate embodiment of the invention where a magnet 249 is mounted on the drive mast 16 to produce on a channel 250 a pulse for each revolution of the main rotor. As the red blade passes over the tail boom, a pulse appears on the channel 250 that is applied to a synchromatch network 252 receiving a second input in the form of a 400 cycle sine wave from an oscillator 254. One output of the network 252, appearing on a channel 256, is applied to one input of a servodrive amplifier 258 to produce a correction signal on an output channel 260 to the stability and control augmentation system of the helicopter 10.

A second output voltage of the network 252 appears on a channel 262 in the form of a modulated 400 cycle signal. This second output is applied to a phase shift network demodulator 264. The phase shift network provides an adjustment of the phase of the input signal from the magnet 249 to match the particular dynamic characteristic of a helicopter airframe.

An output of the network and demodulator 264 is a one-per-rev square wave appearing on a channel 266 and having a selected phase angle relative to the pulse output of the magnet 249. This one-per-rev square wave on the channel 266 is connected to one input of a demodulator/integrator 268.

A second input to the demodulator/integrator 268 is derived from the output of the accelerometer 36 as illustrated in FIG. 2. The one-per-rev vibration signal from the accelerometer 36 is applied by way of a bandpass filter/amplifier 270 to the second input of the demodulator/integrator 268 over a channel 272. The signal on the channel 272 is a sine wave having a magnitude related to the one-per-rev vibrations in the fuselage of the helicopter 10.

An output from the demodulator/integrator 268 is applied over a channel 274 through a selector switch 278 to a second input of the servodrive amplifier 258.

The system thus far described involves an automatic control system whereby vibrations sensed by the accelerometer 36 are employed for control of the magnitude and phase of the output voltage of the channel 260. As in the previously described embodiment of the invention, a manual controller 280 is provided that is connected to a second terminal of the selector switch 278 such that when the switch is in a manual position, the pilot adjusts a potentiometer to select a ride control voltage coupled to the second input of the amplifier 258. This substitutes the pilot and his physical vibration sensing mechanism for the accelerometer 36 to permit him to adjust the controller 280 until he minimizes the one-per-rev vibrations in the fuselage to his satisfaction.

In operation of the system of FIG. 6, the position of a rotor blade corresponding with the maximum acceleration of the helicopter 10 produces a one-per-rev vibration in the fuselage when the rotor blades 11 and 12 are between 150° and 180° from a zero phase reference position. These one-per-rev vibrations will have a sense or phase which depends on whether or not the blade, when at the reference position, is high or low.

Figure 8:
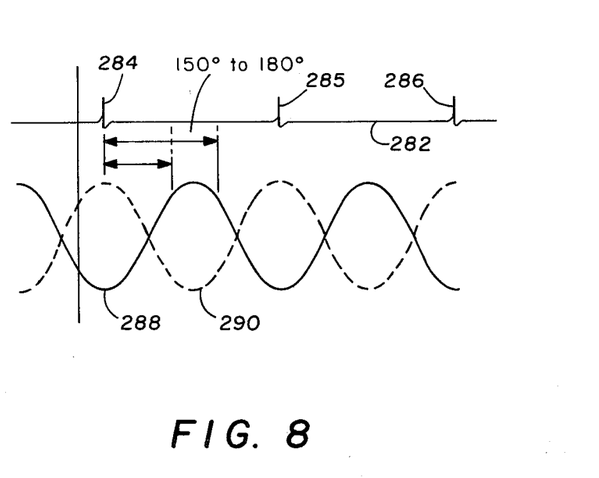
FIG. 8 is a series of waveforms of illustrating the operation of the embodiment of FIG. 6.

Referring to FIG. 8, the waveform 282 comprises pulses 284–286 representing the output of the magnet 249. These pulses respectively occur at a phase of zero degrees, 360° and 720°, that is, one-per-rev of the main rotor. These pulses are then applied to the network 252 to provide a modulated 400 cycle signal on the channel 262 to the phase shift network/demodulator 264.

Assume that the vibration related signal from the accelerometer 36 produces the sine wave 288 having a maximum positive amplitude between 150° and 180° following each of the pulses from the sensor 20. The precise phase angle between the curve 288 and the pulses 284–286 depends upon the characteristics of a given helicopter. The curve 288 represents an aerodynamic unbalance of the rotor assembly where the rotor blade 11 is lifting more than the rotor blade 12. It should be understood that the output from the accelerometer 36 may be displaced 180° from that illustrated by the curve 288, as represented by the dotted curve 290 when the rotor blade 12 is lifting more than the rotor blade 11. In this latter example, the unbalance of the rotor assembly would be maximum at a phase angle of from 330° to 360° with reference to the output pulses of the magnet 249.

To compensate for this phase difference between the outputs of the magnet 249 and the output of the accelerometer 36, the phase shift circuit of the phase shift network/demodulator 264 is utilized to introduce a phase change in the signal on the channel 262 such that it is either in phase or 180° out of phase with the one-per-rev vibration signal from the accelerometer 36.

As explained with reference to the embodiment of FIG. 2, signals from the accelerometer 36 are passed through a bandpass amplifier/filter 270 to eliminate all frequency components of the accelerometer output except the one-per-rev vibrations. This alternating current one-per-rev signal is coupled to the demodulator/integrator 268 in phase with the one-per-rev square wave on the channel 266. The vibration related signal is then demodulated by the one-per-rev square wave and integrated into a DC signal having a magnitude varying with the amplitude of the one-per-rev vibrations detected by the accelerometer 36.

This control voltage is then applied to the second input of the servodrive amplifier 258 where it is combined with the 400 cycle phase controlled sine wave on the channel 256 to produce a correction signal on the channel 260 at the frequency of the signal on the channel 256 and varying in amplitude in accordance with the control voltage from the demodulator/integrator 268. This correction signal thus provides the same information to a stability control augmentation system as produced by the system of FIG. 2.

Figure 9:
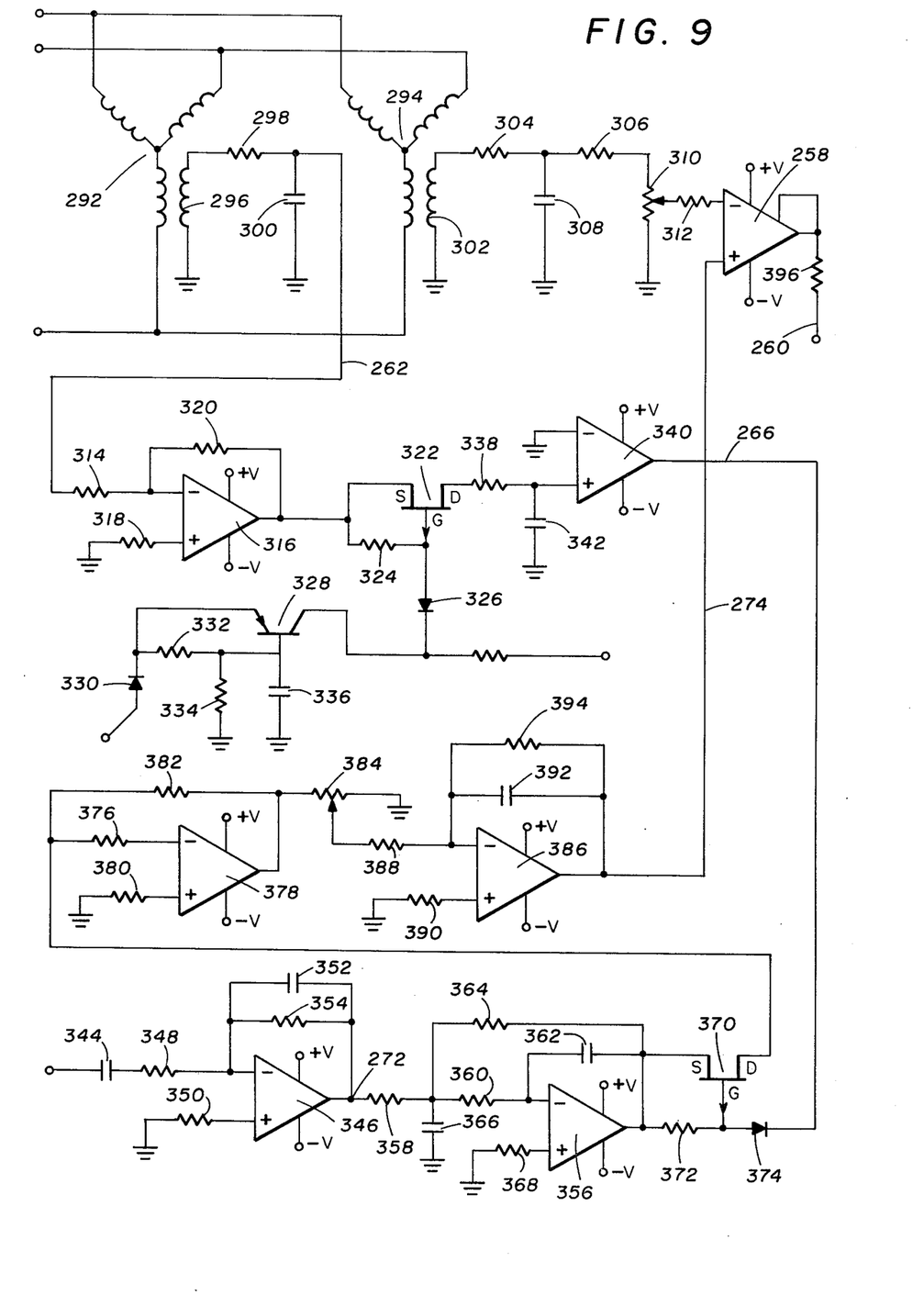
FIG. 9 is a detailed schematic of the alternate embodiment of the invention of FIG. 6.

Referring to FIG. 9, there is shown a schematic of the alternate embodiment of the invention of FIG. 6 for generating a correction signal having a desired phase for cyclic pitch control through a stability control and augmentation system. Synchro circuits 292 and 294 respond to the output of the rotating magnet 249 attached to the drive mast 16 (see FIG. 7) to produce the output signals of the synchromatch network 252. A winding 296 of the synchro circuit 292 is connected to a resistor 298 and a capacitor 300 to provide a modulated 400 cycle signal on the channel 262 to the input of the phase shift network/demodulator 264. A winding 302 of the synchro circuit 294 is connected to a filter including resistors 304 and 306 interconnected to a capacitor 308. The phase control sine wave on the channel 256 is generated at the wiper arm of the potentiometer 310 connected to the filter resistor 306. The wiper arm of the potentiometer 310 is interconnected to a resistor 312 to one input of the servodrive amplifier 258.

A signal on the channel 262 is connected to the phase shift network/demodulator 264 at a resistor 314 as part of the input circuit of a differential amplifier 316. The noninverting input of the amplifier 316 interconnects to ground through a resistor 318. The gain of the amplifier 316 is established by a feedback circuit including a resistor 320.

Amplifier 316 provides an output signal to the source electrode of a field effect transistor 322 as part of a demodulator. Also coupled to the output of the amplifier 316 is the gate electrode of the transistor 322 through a bias resistor 324.

The frequency for demodulating the output of the amplifier 316 connects to the gate electrode of the transistor 322 through a diode 326 having a cathode electrode tied to the collector electrode of a transistor switch 328. The transistor switch 328 is controlled by the demodulating frequency through a diode 330 connected to the emitter electrode of the transistor. A base drive circuit for the transistor 328 comprises a divider network of resistors 332 and 334 interconnected to a capacitor 336.

Operationally, the transistor 328 converts a sine wave signal at the anode of the diode 330 into a square wave base drive voltage at the gate electrode of the field effect transistor 322. During the conduction cycle of the transistor 322, the output of the amplifier 316 is gated through the drain electrode or the field effect transistor and a resistor 338 to the input of a differential amplifier 340. Also connected to the input terminal of the amplifier 340 is a capacitor 342. By operation of the field effect transistor 322 and the amplifier 340 a one-per-rev square wave is generated on the channel 266 for coupling to the demodulator/integrator 268.

A signal from the accelerometer 36 is coupled through a capacitor 344 and a resistor 348 to the input of a differential amplifier 346. The second input of the amplifier 346 is connected to a resistor 350. Comprising the feedback loop for the amplifier 346 are filter elements consisting of a capacitor 352 in parallel with a resistor 354.

An output of the amplifier 346 is generated on the channel 272 to the input of a differential amplifier 356 through resistors 358 and 360. In the feedback loop of the amplifier 356 is a capacitor 362 and a resistor 364. The resistor 364 is connected to the interconnection of resistors 358 and 360 along with a capacitor 366. The second input of the amplifier 356 is connected to a resistor 368.

The output of the amplifier 356 is a filtered sine wave having a frequency of 5 Hz and an amplitude related to the one-per-rev vibrations of the helicopter 10 as sensed by the accelerometer 36. This output is applied to the source electrode of a field effect transistor 370 as part of the demodulator/integrator 268. The gate electrode of the transistor 370 connects to the output of the amplifier 356 through a resistor 372 and to the channel 266 through a diode 374.

Operationally, the transistor 370 is similar to the transistor 192 of FIG. 4. It functions to convert the sine wave input at the source electrode into a control voltage at a drain electrode connected through a resistor 376 to one input of a differential amplifier 378.

A second input to the amplifier 378 connects to a resistor 380 and a feedback loop includes a resistor 382 connected between the output terminal and the inverting input terminal.

The control voltage from the amplifier 378 is generated at the wiper arm of a potentiometer 384. This voltage is applied to one input of an integrating amplifier 386 through an input resistor 388. The second input of the amplifier 386 connects to a resistor 390. Connected in the feedback loop of the amplifier 386 is a capacitor 392 in parallel with a resistor 394 as part of an integrating circuit. This part of the circuit of FIG. 9 is similar to the integrating amplifier 198 of FIG. 4.

An output signal from the amplifier 386 is connected by means of the channel 274 to the input of the servo-drive amplifier 258 wherein it is combined with the voltage at the wiper arm of the potentiometer 310 to produce a correction signal of a desired phase for cyclic pitch control of the rotor blades 11 and 12. An output from the amplifier 258 is applied by way of a resistor 396 and channel 260 to the control input of the stabilization control and augmentation system for the helicopter 10.

While several embodiments of the invention, together with modifications thereof, have been described in detail herein and shown in the accompanying drawings, it will be evident that various further modifications are possible without departing from the scope of the invention.

What is claimed is:

1. In a helicopter having means to provide cyclic pitch to blades of a rotor, the combination which comprises:
    means for generating a reference signal having a frequency related to the speed of rotation of the helicopter rotor and at a phase corresponding to a desired cyclic pitch,
    means to sense vertical vibrations in the airframe at the frequency of one cycle per blade revolution to produce a vibration signal,
    means to sample said vibration signal to generate a control voltage which varies in magnitude in accordance with the magnitude of said vibration signal, and
    means for combining the control voltage with the reference signal to vary said cyclic pitch at least in part in response to said voltage.

2. A system for controlling one-per-rev vibrations in a helicopter, comprising in combination:
    means for generating a reference pulse having a phase corresponding to a desired cyclic pitch for each revolution of a helicopter rotor,
    means for generating a pulse train synchronized with the reference pulse at a repetition rate related to rotation of the helicopter rotor,
    means responsive to the reference pulse and the pulse train for generating a modulation voltage having a frequency related to the speed of rotation of the helicopter rotor and at a phase corresponding to a desired cyclic pitch,
    means for generating a vibration related signal dependent upon the amplitude and phase of one-per-rev vibrations in a helicopter airframe,
    means for sampling and storing the vibration related signal to generate a control voltage proportional to the maximum amplitude of said vibrations, and
    means for modulating the control voltage with the modulating voltage to be applied to a helicopter rotor cyclic pitch control.

3. A system for controlling one-per-rev vibrations as set forth in claim 2 wherein said means for sampling and storing includes means for demodulating the vibration related signal with the modulation voltage to establish the control voltage.

4. The system for controlling one-per-rev vibrations as set forth in claim 3 wherein said means for generating a vibration related signal includes means for adjusting the phase of said signal prior to demodulation with the modulation voltage.

5. The system for controlling one-per-rev vibrations as set forth in claim 4 including:
    manually adjustable means for generating a ride control voltage having a magnitude related to a desired vibration correction, and
    means for switching between the ride control voltage and the control voltage to connect the selected signal to said means for modulating.

6. A system for controlling one-per-rev vibrations in a helicopter, comprising in combination:
    means for generating a reference signal having a frequency related to the speed of rotation of a helicopter rotor and at a phase corresponding to a desired cyclic pitch, manually adjustable means for generating a ride control voltage having a magnitude related to a desired vibration correction, and means for modulating the ride control voltage with the reference signal to be applied to a helicopter rotor cyclic pitch control.

7. The system for controlling one-per-rev vibrations as set forth in claim 6 wherein said means for generating a reference signal includes:

means for generating a reference pulse having a phase corresponding to a desired cyclic pitch for each revolution of the helicopter rotor, means for generating a pulse train synchronized with the reference pulse at a repetition rate related to rotation of the helicopter rotor, and means responsive to the reference pulse and the pulse train for generating the reference signal having frequency related to the speed of rotation of the helicopter rotor and at a phase corresponding to a desired cyclic pitch.

8. The system for controlling one-per-rev vibrations as set forth in claim 7 including:

means for generating a vibration related voltage dependent upon the amplitude and phase of one-per-rev vibrations in a helicopter airframe, and means for switching between the vibration related voltage and the ride control voltage for connecting the selected signal to said means for modulating.

9. The system for controlling one-per-rev vibrations as set forth in claim 9 including means for sampling and storing the vibration related voltage to establish a control voltage proportional to the maximum amplitude of said vibrations.

10. A system for controlling one-per-rev vibrations in the helicopter, comprising in combination:

means for generating a reference signal having a phase corresponding to the desired cyclic pitch for each revolution of a helicopter rotor, an oscillator for generating a periodic wave output, means responsive to the reference signal and the periodic wave output for generating a periodic wave voltage having a phase controlled by the phase of the reference signal and for generating a one-per-rev related wave, means for generating a vibration related signal dependent upon the amplitude and phase of one-per-rev vibrations in a helicopter airframe, means to sample said vibration related signal and to modulate said signal with the one-per-rev related wave to generate a control voltage, and means for combining the control voltage with the periodic wave voltage to vary said cyclic pitch at least in part in response to said voltages.

11. A system for controlling one-per-rev vibrations as set forth in claim 10 wherein said means for generating the one-per-rev related wave includes means for modulating the output of said oscillator with said reference signal.

12. A system for controlling one-per-rev vibrations as set forth in claim 11 wherein said means for generating the one-per-rev related wave includes means for adjusting the phase of the modulated oscillator output, and means for demodulating the phase adjusted output to generate the one-per-rev related wave.

13. A system for controlling one-per-rev vibrations as set forth in claim 10 including means for adjusting the phase of the vibration related signal prior to demodulating with the one-per-rev related wave.

14. A system for controlling one-per-rev vibrations as set forth in claim 10 including:

manually adjustable means for generating a ride control voltage having a magnitude related to a desired vibration correction, and means for switching between the ride control voltage and the control voltage to connect the selected voltage to said means for combining.

15. A system for controlling one-per-rev vibrations in a helicopter, comprising in combination:

a magnetic pickoff attached to a drive mast of a helicopter rotor and rotating therewith, a first synchro responsive to the magnetic pickoff to generate a modulated periodic wave, a second synchro also responsive to the magnetic pickoff to generate a phase controlled periodic wave, a phase shift/demodulator responsive to the modulated periodic wave of said first synchro to adjust the phase thereof to match the particular dynamic characteristics of a helicopter airframe and generate a one-per-rev square wave, means to sense vertical vibrations in the ariframe at the frequency of one cycle per blade revolution to produce a vibration related signal, a demodulator/integrator responsive to the vibration related signal and the one-per-rev square wave to generate a control voltage that varies in magnitude and phase in accordance with the magnitude of the vibration signal, and a servodrive amplifier responsive to the phase controlled periodic wave from said second synchro and the output of the demodulator/integrator to generate a correction signal to be applied to a helicopter rotor cyclic pitch control.

16. A system for controlling one-per rev vibrations as set forth in claim 15 including:

manually adjustable means for generating a ride control voltage having a magnitude related to a desired vibration correction, and means for switching between the ride control voltage and the control voltage to connect the selected voltage to said means for combining.

17. The method of controlling one-per-rev vibrations in a helicopter, comprising the steps of:

generating a signal related to the motion of a helicopter rotor blades including a blade position reference signal, generating a frequency signal having a phase corresponding to a desired cyclic pitch in response to the signal related to blade motion and the blade position signal, generating a vibration related signal dependent upon the amplitude and phase of one-per-rev vibrations in a fuselage of the helicopter, sampling and storing the vibration related signal to establish a control voltage proportional to a maximum amplitude of said vibrations, and applying said frequency signal to a cyclic control of a helicopter rotor assembly at an amplitude dependent upon said control voltage.

18. The method of controlling one-per-rev vibrations as set forth in claim 17 wherein the step of generating the signal related to blade motion includes generating a one-per-rev pulse and a pulse train having a repetition rate related to rotation of the helicopter rotor.

19. The method of controlling one-per-rev vibrations as set forth in claim 18 wherein the step of generating the frequency signal includes combining the oneper-rev pulse and the pulse train to provide a square wave voltage having a frequency related to the helicopter rotation.

20. The method of controlling one-per-rev vibrations as set forth in claim 19 wherein the step of applying said frequency signal includes modulating the control voltage with the square wave voltage.

21. The method of controlling one-per-rev vibrations in a helicopter, comprising the steps of:
generating a frequency signal having a phase corresponding to a desired cyclic pitch,
generating a vibration related signal independent upon the amplitude and phase of one-per-rev vibrations in a fuselage of a helicopter,
sampling and storing said vibration related signal to establish a control voltage which varies at a rate in dependence upon variation in the maximum amplitude of said vibrations,
integrating the control voltage with respect to time, and
applying said frequency signal to a cyclic control pitch at an amplitude dependent upon said integrated control voltage.

22. The method of controlling one-per-rev vibrations as set forth in claim 21 wherein the step of sampling and storing includes demodulating the vibration related signal with the frequency signal to establish the control voltage.

23. A system for controlling one-per-rev vibrations in a helicopter, comprising in combination:
means for generating a series of pulses related to the motion of a helicopter rotor blade including a blade position reference pulse,
a function generator responsive to the series of pulses and the reference pulse for generating a reference signal having a frequency related to the speed of rotation of the helicopter rotor and at a phase corresponding to a desired cyclic pitch,
means for generating a control voltage having a magnitude related to the one-per-rev vibrations in the fuselage of a helicopter, and
means for modulating the control voltage with the reference signal to be applied to a helicopter rotor cyclic pitch control.

24. A system for controlling one-per-rev vibrations as set forth in claim 23 wherein said means for generating a control voltage includes means for receiving a vibration related signal dependent upon the amplitude and phase of one-per-rev vibrations in the helicopter fuselage, and means for demodulating the vibration related signal with the reference signal to generate the control voltage.

25. The system for controlling one-per-rev vibrations as set forth in claim 24 including means for adjusting the phase of the vibration related signal prior to demodulating with the reference signal.

* * * * *